J. J. DANA
TIRE FOR MOTOR VEHICLES.
APPLICATION FILED JAN. 31, 1919.
1,338,290.
Patented Apr. 27, 1920.
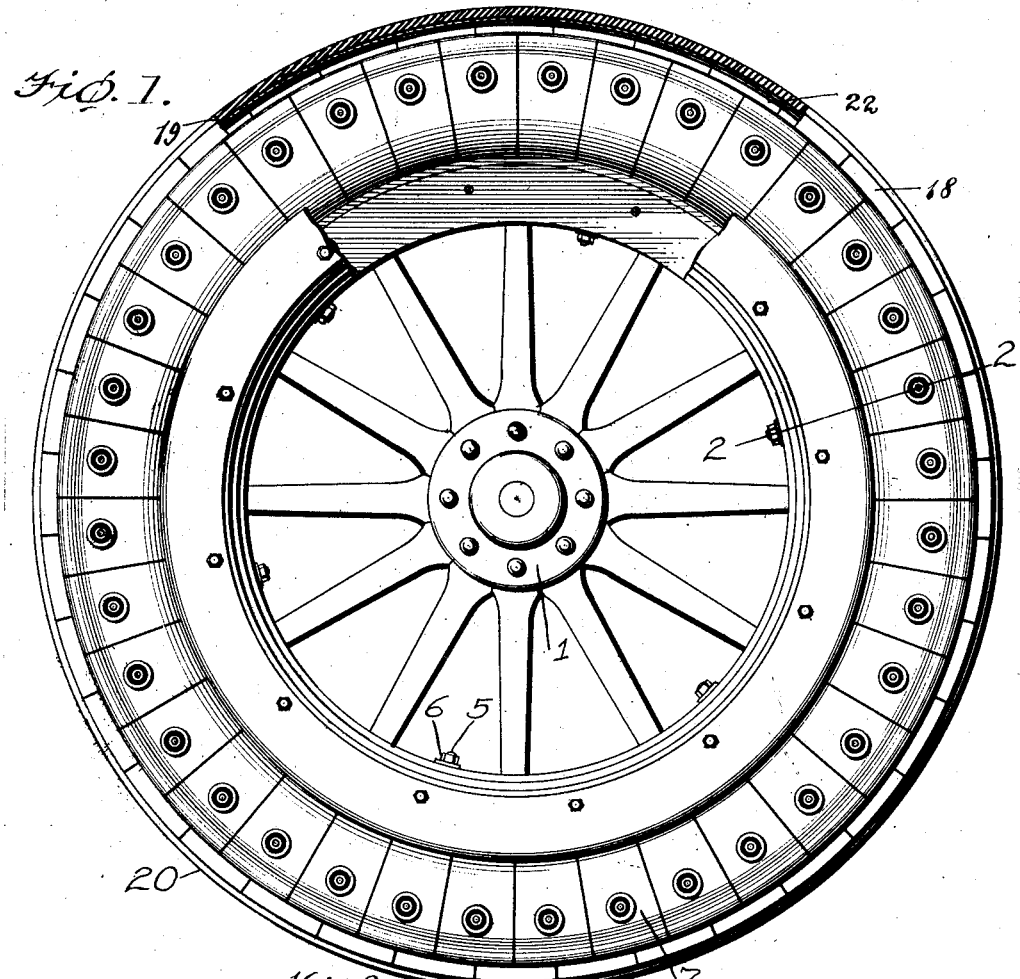
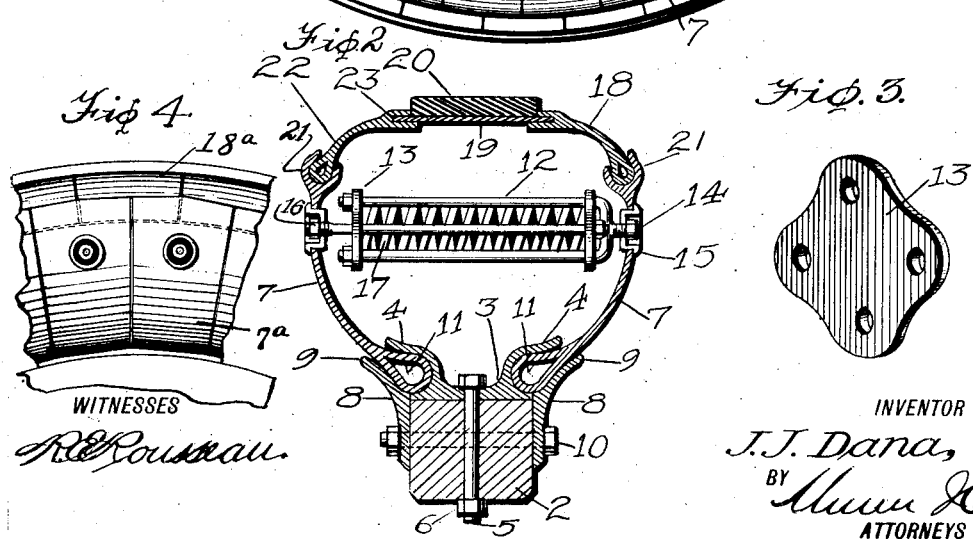
WITNESSES
INVENTOR
J. J. Dana,
BY
ATTORNEYS

UNITED STATES PATENT OFFICE.

JOHN JEREMIAH DANA, OF SAVANNAH, GEORGIA.

TIRE FOR MOTOR-VEHICLES.

1,338,290.　　　　　Specification of Letters Patent.　　Patented Apr. 27, 1920.

Application filed January 31, 1919. Serial No. 274,227.

*To all whom it may concern:*

Be it known that I, JOHN J. DANA, a citizen of the United States, and a resident of Savannah, in the county of Chatham and State of Georgia, have invented certain new and useful Improvements in Tires for Motor-Vehicles, of which the following is a specification.

My invention is an improvement in tires for motor vehicles, and has for its object to provide a tire having the resiliency of a pneumatic tire, without the liability of the same to puncture and blowout, and wherein the resiliency of the tire may be varied to suit conditions.

In the drawings:

Figure 1 is a side view of the improved tire, with parts in section;

Fig. 2 is a section on the line 2—2 of Fig. 1;

Fig. 3 is a perspective view of one of the plates;

Fig. 4 is an enlarged side view of a portion of the tire, showing a modified form of housing and casing plate.

The present embodiment of the invention is shown in connection with the wheel 1 of usual construction, the tire being supported by the felly 2 of the wheel. Upon the felly is arranged a rim 3, which has flanges 4 extending radially outwardly and laterally with respect to the plane of the wheel, the said flanges being curved in practically the reverse direction of the usual clencher flanges, that is, the said flanges have their convex surfaces adjacent.

The rim is held in place on the felly by bolts 5, the said bolts being passed from without inwardly and being engaged by nuts 6 on the inner face of the felly. A series of housing plates 7 is supported by the rim, and by housing rings 8 they are secured to the opposite side faces of the rim, these housing rings extending beyond the peripheral surface of the felly and being curved outwardly, as shown at 9, to coöperate with the flanges 4 to grip the housing plates 7 to be presently described.

The housing rings 8 are held in place by bolts and nuts 10 which are passed transversely of the felly. Each of these housing plates 7, which are arranged with their side edges adjacent, has a bead 11 at its inner end, and these beads are received between the elements 4 and 9 and are gripped by the said elements to prevent displacement of the housing plates. Thus a rocking connection is provided between the housing plates 7 and the rim. The housing plates at the opposite faces of the wheel are in register, and each pair of registering plates is connected by the spring mechanism shown more particularly in Fig. 2.

The said mechanism comprises a pair of U-bolts 12, the arms of each bolt, passing through registering openings in a pair of stop plates 13. The bolts are oppositely arranged, as shown in Fig. 2, and the body of each bolt has a threaded stem 14 which passes through an opening in a countersunk washer 15 arranged within an opening in the housing plate, and each stem is engaged by a nut 16 in the countersink of the washer.

Referring to Fig. 2, it will be noted that each washer has a marginal flange or rib engaging the housing plate to limit the inward movement of the washer. A coil spring 17 is arranged between the four arms of the two U-bolts, engaging at its ends the plates. The tire is completed by two series of casing sections 18 and a tread ring 19, the tread ring carrying a tread member 20 of rubber or the like on its outer face. Each of the housing plates 7 is provided at the edge remote from the rim with a species of socket 21, and each casing section has a bead or head 22 at its inner end which engages within the socket.

The casing sections 18 also have grooves 23 in their outer ends which receive the edges of the ring 19. The beads 22 may rock in the sockets 21 but the steel tread ring prevents their disengagement. With this arrangement there is a free movement of the parts with respect to each other, but cushioned in every direction by the springs 12. The plates 7 are resilient as are also the casing sections 18, and the tread ring 19. By means of the nuts 16 the tension of the springs 17 may be varied in accordance with the conditions which the tire is intended to meet. The rubber is dispensed with so far as used for resiliency, the band 20 being merely to increase traction.

It will be noticed that each series of housing plates 7 is staggered with respect to the adjacent series of casing sections, and that the casing sections of the two series at the opposite faces of the wheels are arranged opposite each other or in register.

Referring to Fig. 4, it will be noticed that the edges of the plates 7ª and 18ª are straight and not curved, and that the said plates are spaced apart slightly at their adjacent edges.

I claim:

1. A tire of the character specified comprising a rim, a plurality of series of housing plates, the series being arranged at opposite sides of the wheel and having a limited hinge connection with the rim, a series of casing plates for each series of housing plates and having a limited hinge connection with the outer edges of the housing plates, a tread supporting ring, the casing plates having slots for receiving the edges of the ring, and a yielding connection between each pair of housing plates.

2. A tire of the character specified comprising oppositely arranged series of housing plates, the members of each series abutting at their side edges, means for connecting the series to the opposite edges of the rim of a wheel to permit a limited hinge motion, a resilient connection between each pair of oppositely arranged housing plates, said connection being adjustable, and a casing means for connecting the free edges of the housing plates and having a limited hinge connection with said plates.

3. A tire of the character specified comprising oppositely arranged series of housing plates, the members of each series abutting at their side edges, means for connecting the series to the opposite edges of the rim of a wheel to permit a limited hinge motion, a resilient connection between each pair of oppositely arranged housing plates, and a casing means for connecting the free edges of the housing plates and having a limited hinge connection with said plates.

4. A tire of the character specified comprising oppositely arranged series of housing plates, the members of each series abutting at their side edges, means for connecting the series to the opposite edges of the rim of a wheel to permit a limited hinge motion, a resilient connection between each pair of oppositely arranged housing plates, said connection being adjustable.

5. A tire of the character specified comprising oppositely arranged series of housing plates, the members of each series abutting at their side edges, means for connecting the series to the opposite edges of the rim of a wheel to permit a limited hinge motion, and a resilient connection between each pair of oppositely arranged housing plates.

JOHN JEREMIAH DANA.

Witnesses:
L. A. HARKNESS,
H. G. ARDEN.